UNITED STATES PATENT OFFICE.

FREDERICK MARK BECKET, OF NIAGARA FALLS, NEW YORK, ASSIGNOR TO ELECTRO METALLURGICAL COMPANY, OF NIAGARA FALLS, NEW YORK, A CORPORATION OF WEST VIRGINIA.

PROCESS OF REFINING CRUDE ELECTRIC-FURNACE SILICON.

1,386,227. Specification of Letters Patent. Patented Aug. 2, 1921.

No Drawing. Application filed September 26, 1919. Serial No. 326,505.

*To all whom it may concern:*

Be it known that I, FREDERICK M. BECKET, a citizen of the United States, residing at Niagara Falls, in the county of Niagara and State of New York, have invented certain new and useful Improvements in Processes of Refining Crude Electric-Furnace Silicon, of which the following is a specification.

This invention is a novel process for refining crude silicon, which term is used herein to designate the commercial electric furnace products containing high percentages, say upward of 90% of silicon, in conjunction with smaller proportions of impurities, of which iron is the most important. My process is most advantageously applied to commercial crude silicon containing 95–97% of silicon, and usually 1.5–4% of iron, associated with smaller amounts of aluminum, carbon, silicon carbid, etc.

I have discovered that hydrofluoric acid acts selectively upon crude silicon to eliminate iron while leaving the silicon practically unattacked.

The silicon may be finely crushed or ground in order to increase the surface exposed for contact, but extremely fine grinding is not necessary in practice, and a purification amply sufficient for most industrial purposes may be secured when the silicon is crushed to 8–10 mesh. The following conditions have proven satisfactory in practice, although it will be understood that the invention is not restricted to the manipulative or other details given by way of example.

The crude silicon is crushed to pass a screen having 8 meshes to the linear inch and there is added to the charge, preferably in a wooden vat or container, a weight of water approximately equal to the weight of silicon. I then add commercial 30% hydrofluoric acid (HF) in amount depending upon the iron content of the crude silicon. For the commercial 96–97 per cent. silicon about 20% of its weight of commercial acid is a satisfactory proportion. The whole is then mixed and permitted to stand, preferably with occasional stirring, at ordinary temperatures, for 24–48 hours or longer if desired. At the end of this period the mixture may be drained and washed, and it will be found that the iron content has been reduced to a few tenths of one per cent., while the proportionate loss of silicon is very small. For example it has been found possible thus to remove 80–90% or upward of the iron with not more than 3–5% of the silicon. A purified product satisfactory for most industrial uses contains 98–99% of silicon or upward associated with less than 0.5% of iron.

The operating conditions may of course be variously modified without departure from my invention. For example the reaction may be speeded up by finer crushing or grinding, by agitation, or by raising the temperature, by means of the exothermic reaction or otherwise, material losses of acid by volatilization being avoided. If desired a counter-current or other continuous type of leaching operation may be used. Similarly acid mixtures, as for example mixtures of hydrofluoric with hydrochloric or sulfuric acid may be used. Where a considerable excess of acid is employed, the recovered acid solution may either be applied to fresh portions of the charge until substantially exhausted, or it may be reinforced by fresh acid additions and thus used again.

I claim:—

1. Process of refining crude electric furnace silicon containing iron, consisting in crushing the crude material and subjecting the particles to the solvent action of hydrofluoric acid at sufficiently low temperature to avoid substantial loss of silicon.

2. Process according to claim 1 in which the particles are subjected to the solvent action of hydrofluoric acid at approximately normal temperature until the iron content is reduced to less than 0.5%.

In testimony whereof I affix my signature.

FREDERICK MARK BECKET.